(12) United States Patent
Hyder et al.

(10) Patent No.: US 7,865,451 B2
(45) Date of Patent: Jan. 4, 2011

(54) SYSTEMS AND METHODS FOR VERIFYING JOBSEEKER DATA

(75) Inventors: Adam Hyder, Los Altos, CA (US); Chyr-Chong Joseph Ting, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 737 days.

(21) Appl. No.: 11/609,086

(22) Filed: Dec. 11, 2006

(65) Prior Publication Data

US 2008/0140680 A1 Jun. 12, 2008

(51) Int. Cl.
*G06Q 10/00* (2006.01)
(52) U.S. Cl. .................. 705/321; 705/320
(58) Field of Classification Search .......... 705/1.1, 705/320, 321

See application file for complete search history.

(56) References Cited

U.S. PATENT DOCUMENTS 6,289,340 B1 * 9/2001 Puram et al. .......... 707/5
2006/0026075 A1 * 2/2006 Dickerson et al. ........ 705/26

* cited by examiner

*Primary Examiner*—Traci L Casler
*Assistant Examiner*—Amanda Kirlin
(74) *Attorney, Agent, or Firm*—James J. DeCarlo; Greenberg Traurig, LLP

(57) ABSTRACT

Methods and systems of verifying jobseeker information are disclosed. A request to verify jobseeker data can be received from a recruiter. An endorsement indicator that ratifies the validity of the jobseeker data can be requested from at least one endorsing partner. The request can be made to an endorsement module of the at least one endorsing partner. The endorsement indicator can be received from the endorsement module of the at least one endorsing partner.

22 Claims, 10 Drawing Sheets

FIG. 5

SYSTEMS AND METHODS FOR VERIFYING JOBSEEKER DATA

BACKGROUND

1. Field

The present disclosure relates to job listing services. In particular, it relates to systems and methods of providing verification of jobseeker background and information.

2. General Background

Job listing providers generally provide searchable databanks of job listings related to employment opportunities and openings. In the current generation of online job listing services, listing service providers provide job searching capabilities to jobseekers based on search keywords entered by the jobseeker. As such, jobseekers can apply for jobs in which the jobseekers are interested. In addition, recruiters can also search for candidate among jobseekers that have posted their resume or other information. Generally, recruiters use a manual method to verify references, work experience and other data provided by the jobseeker.

SUMMARY

In one aspect, there is a method of verifying jobseeker information. A request to verify jobseeker data can be received from a recruiter. An endorsement indicator that ratifies the validity of the jobseeker data can be requested from at least one endorsing partner. The request can be made to an endorsement module of the at least one endorsing partner. The endorsement indicator can be received from the endorsement module of the at least one endorsing partner. The jobseeker data can be stored in a jobseeker profile. The at least one endorsing partner can be an Internet social network company, a university, a company, or a previous employer of the jobseeker.

In another aspect, a rating for the jobseeker is calculated based on the verification of the data.

In a further aspect, the endorsement indicator is a number of endorsers for the jobseeker. The endorsement indicator can be a profile of the jobseeker that can be used to confirm jobseeker data. In another aspect, the endorsement indicator is a reference profile corresponding to an endorser of the jobseeker. The endorsement indicator can be presented to the recruiter.

In another aspect, a secondary endorsement indicator that verifies data in the reference profile is requested from the at least one endorsing partner.

In one aspect, there is a system of providing verification of jobseeker information comprising a user interface module and a verification module. The user interface module receives from a recruiter a request to verify jobseeker data. The verification module requests from at least one endorsing partner an endorsement indicator that ratifies the validity of the jobseeker data. The request can be made to an endorsement module of the at least one endorsing partner. The verification module can be further configured receive the endorsement indicator from the endorsement module of the at least one endorsing partner.

DRAWINGS

The features and objects of alternate embodiments of the present disclosure will become more apparent with reference to the following description taken in conjunction with the accompanying drawings of various examples wherein like reference numerals denote like elements and in which:

FIG. 5 depicts an exemplary user interface for listing jobseekers according to one embodiment.

DETAILED DESCRIPTION

The system and method disclosed herein permit a recruiter to verify data provided by a jobseeker. Generally jobseekers provide data to the job listings service provider as part of registering or applying for a job at the job listing service provider. The systems and methods disclosed herein offer recruiters the possibility of verifying the data supplied the jobseekers. Data verification is conducted by contacting databases that may contain information about the jobseeker. Such databases can be accessed through computer various modules via a data network. Thus, the databases and verification services can belong to companies and entities that have agreed to provide data verification. Therefore, such companies and entities are verification partners of the job listings service provider. The verification partners can be equipped with computer infrastructure to receive digital requests of verification over a data network and transmit endorsement indicators. As such, the job listings service provider can effectively "crawl" various Internet websites, or otherwise other modules of the verification partners in order to obtain endorsement indicators. Endorsement indicators can generally be verification messages or data received from various endorsement modules. Such endorsement indicators can be reflective of a positive or a negative comment or opinion of the jobseeker.

Figure 1A:
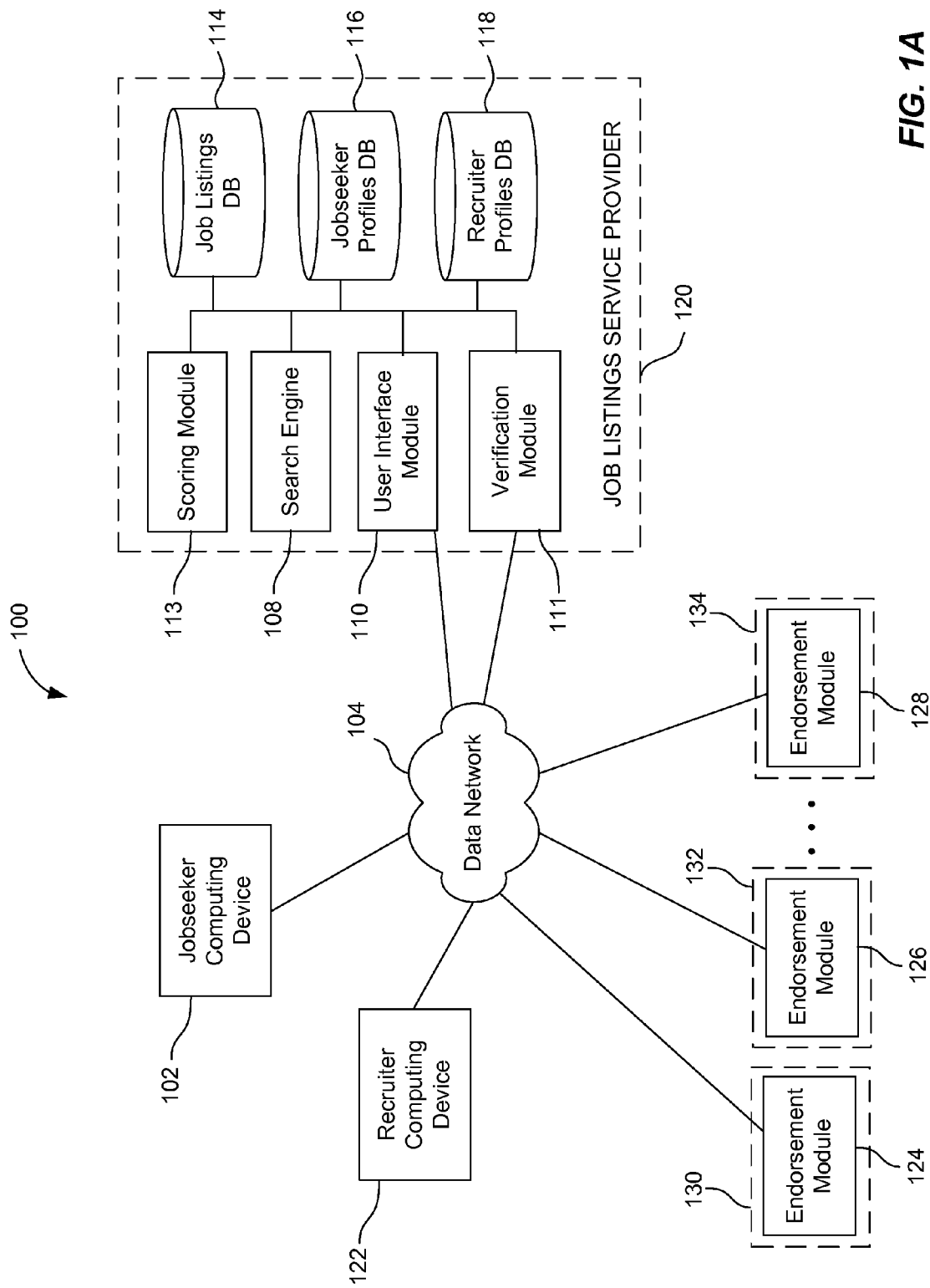
FIG. 1A-1B depict component diagrams of a system for verifying jobseeker information according to one embodiment.

FIG. 1A depicts a component diagram of a system for verifying jobseeker information according to one embodiment. In one embodiment, the job listing service provider 120 can host an online service of listing, posting and searching jobs. As such the job listing service provider 120 can be a business entity that owns and operates a computer infrastructure connected to a data network in order to provide a job listing service.

Jobseekers can access the services provided by the job listing service provider 120 via a data network 104. In one embodiment, the data network 104 is the Internet. In another embodiment, the data network 104 is an intranet. A jobseeker can utilize a jobseeker computing device 102 to communicate via the data network 104 with one or more computing modules and or services that are part of the computer infrastructure managed by the job listing service provider 120. In addition, a recruiter can utilize a recruiter computing device 122 to communicate via the data network 104 with one or more computing modules and or services that are part of the computer infrastructure managed by the job listing service provider 120.

In one embodiment, a user interface module 110 can be included as part of the computer infrastructure operated by the listing service provider 120. The user interface module 110 can be configured with logic to communicate with the jobseeker computing device 102 by sending and receiving data. Likewise, the user interface module 110 can be configured with logic to communicate with the recruiter computing device 122 by sending and receiving data.

In addition, in one embodiment, the user interface module 110 is configured to receive job search requests from the jobseeker computing device 102. The job search requests can include parameters entered by the jobseeker such as location, title, and salary of a job listing. In another embodiment, the user interface module 110 can be configured to receive an indication from the jobseeker that the jobseeker is interested in a job from the set of job listings. For example, the indication can be submission of the resume of the jobseeker, the submission of personal data, checking a checkbox in a user interface that indicates that the user would like to apply for a particular job listing, etc. In one embodiment, the user interface module 110 can be configured to receive the set of jobseeker qualifications. For example, qualifications associated with a jobseeker can include positions held, years of experience, computer skills, activities performed at previous jobs, etc.

As such, the user interface module 110 can also communicate with a jobseeker profiles database 116 to store and retrieve jobseeker's profiles. For example, jobseeker qualifications, jobseeker resume, personal data, contact information, etc., can be stored at the jobseeker profiles database 116.

In another embodiment, the user interface module 110 can be further configured to receive the set of requisites of the job listing. For example, the set of requisites can include minimum years of experience, expected certifications, activities performed at previous jobs, etc. In addition, the user interface module 110 can also communicate with a recruiter profiles database 118 to store and retrieve recruiter's profiles data. For example, the set of requisites can include listed jobs, requisites for listed jobs, contact information, company data and information, etc.

In another embodiment, the user interface module 110 can be configured to receive a jobseeker search request from a recruiter. The jobseeker search request can be submitted by a recruiter to search for one or more jobseekers that match the criteria established by the recruiter.

In another embodiment, the user interface module 110 can be further configured to receive an indication from the recruiter that the recruiter is interested in a jobseeker. The indication can be for example a request to download or otherwise check the jobseeker information. In another example, the indication can be the checking of a checkbox that corresponds to a jobseeker.

In another embodiment, the user interface module 110 can be further configured to permit the recruiter to request the verification of jobseeker information.

In one embodiment, a search engine 108 can be included as part of the computer infrastructure operated by the listing service provider 120. The search engine 108 can communicate with a job listings database 114 to store and retrieve job listing data.

Furthermore, the search engine 108 can also communicate with the jobseeker profiles database 116 to search jobseeker's profiles. In addition, the search engine 108 can also communicate with the recruiter profiles database 118 to search the recruiter's profiles data.

In one embodiment, searches by a jobseeker can be received at the search engine 108. Jobseeker queries can be received at a search engine 108. In one embodiment, the search engine 108 is configured with logic to determine whether the search words submitted by the jobseeker match any job listing descriptions as stored in the job listings database 106. For example, job listings can have metadata such as job title, location, surrounding areas, salary, associated keywords, employer name, identifiers, job affinity information, etc. The search engine 108 can be configured to compare each of these pieces of data against search words used by the jobseeker.

Thus, the search engine 108 is configured to search a job listing database 114 to identify a set of jobs listings having associated metadata that match the search criteria received from the jobseeker.

In another embodiment, searches by a recruiter can be received at the search engine 108. The search engine 108 can be configured to search the jobseeker profiles database 116 to identify a set of jobseekers having associated metadata that match a search criteria received from the recruiter.

In another embodiment, a verification module 111 can be included as part of the computer infrastructure operated by the listing service provider 120. The verification module 111 can be configured to receive requests from recruiters for verifying jobseeker information. Requests from the recruiter can be received from the recruiter computing device 122.

In one embodiment, the verification module 111 can be configured with logic to invoke one or more web services provided by endorsement modules 124, 126 and 128. The verification module 111 can therefore be configured with data network connectivity so as to communicate over the data network 104 with one or more endorsing partners 130, 132 and 134. The verification module can communicate with the endorsing partners through endorsement modules 124, 126 and 128 of each of the endorsing partners. The endorsement modules 124, 126 and 128 can be any type of computer software module configured to receive and transmit data from databases of social networks, online communities, employment records, education records, etc.

Upon receiving a request from a recruiter, the verification module 111 can access the jobseeker profile database 116 and retrieve jobseeker information to be verified. For example, the verification module 111 can retrieve education information of a jobseeker. In another example, the verification module 111 can retrieve previous employment information of a jobseeker. In yet another example, the verification module 111 can retrieve contact or reference information provided by a jobseeker and stored in a jobseeker profile.

Once the verification module 111 determines the data to be verified, the verification module 111 can submit a request for endorsement from one or more endorsing partners. Endorsing partners can host endorsement modules such as endorsement module 124, endorsement module 126 and/or endorsement module 128. Endorsing partners can be third party entities such as universities, companies or corporations and/or social networks such as Internet virtual social networks that can be partnered with the job listings service provider 120 in order to provide endorsements for jobseeker data. As such, the verification module 111 can request an endorsement indicator to be sent back to the verification module 111 which can then later be used to assess the validity of the jobseeker data. Therefore, the endorsement indicator can be presented in any form of data structure or protocol that has been previously agreed upon between the job listing service provider 120 and the endorsing partners.

Various examples of web interfaces and APIs can be provided by the endorsement modules 124, 126 and 128. The following are examples of functions or methods that can be offered for requesting data from endorsement modules, and which can return endorsement indicators: personProfile getProfile(Person), int getTotalEndorsements(Person), person getConnections(Person), endorsement getEndorsements (PersonProfile, JobFunction), etc. Therefore, endorsement indicators can be profiles of jobseekers references, recommendation letters, ratings of the jobseeker by other users of a social network, certification that the jobseeker attended a certain university, took a certain course or obtained a give degree, authentication of documents, verification of previous employment, etc.

In one example, the verification module 111 can be configured to request the profile of the jobseeker from one or more endorsement modules. As such, the verification module 111 can relay the received jobseeker's profile to a scoring module 113. The scoring profile 113 can then assess and analyze the similarities between the jobseeker profile in another social network and the jobseeker profile stored at the jobseeker's profile database 116 as provided by the jobseeker.

In another example, the verification module 111 can be configured to request the number of endorsements for the jobseeker in a particular social network as related to the jobseeker. For example, a jobseeker may be a member of a social network and have a score for reputation based on the number of endorsements. The verification module 111 can then provide the number of endorsements to the scoring module 113. In turn, the scoring module 113 can analyze and provide an updated score of the jobseeker.

In yet another example, the verification module 111 can request a reference profile corresponding to an individual whom the jobseeker used as a reference. The verification module 111 can then further request endorsements for the reference profile in one or more social networks. In another example, the verification module 111 can request the profile of individuals who are connected or related to the jobseeker in a social network. Thus, for example, if the jobseeker has associated friends or acquaintances or endorsers, the verification module 111 can receive profiles of such individuals in order to further verify information of such individuals.

In yet another example, the verification module 111 can be configured to request an endorsement from an endorsement module 124, 126 or 128 of a specific position or job function previously held by the jobseeker. For example, the verification module 111 can request from one or more endorsement modules information regarding letters of recommendation or actual endorsing text or comments entered by endorsing individuals.

In one embodiment, a reputation score can be calculated by the scoring module 113 based on one or more endorsements or endorsement indicators received from the verification module 111. For example, the scoring module 113 can be configured to calculate a candidate score R based on the following formula: $R=\text{sum}(E(c, j)*R(p))$, where E is the endorsement score for candidate c for job function j, and R(e) is the reputation of the endorser based on the number of endorsements received for the endorser. Thus, reputation of the endorser can also affect to final candidate score.

Figure 1B:
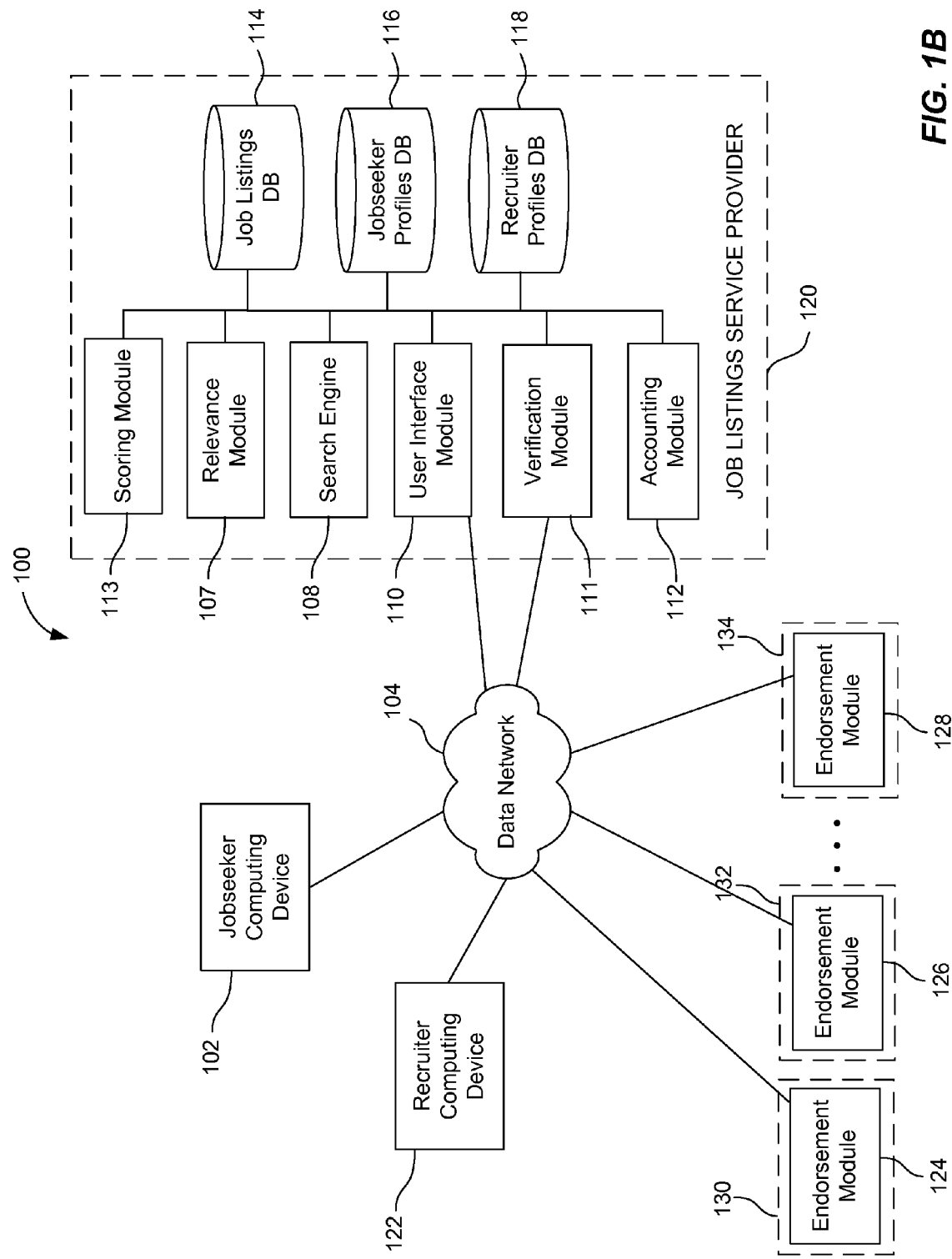

FIG. 1B depict component diagrams of a system for verifying jobseeker information according to one embodiment. In addition, a relevance module 107 and an accounting module 112 can be incorporated into the system. The relevant module 107 can be utilized for recommending job listings to a recruiter.

Thus, the search engine 108 can interact with a relevance module 107 to further refine search results. In one example, the jobseeker search is refined to show more relevant jobs based on the profile of the jobseeker. In another example, the recruiter search is refined to show more relevant applicants based on requisites of the recruiter.

In another example, the search engine 108 can interact with the relevance module 107 in order to perform matching of job listing requisites and jobseeker qualifications in order to provide the recruiter with a list of relevant jobseekers. The recruiter can then download check the jobseeker information of the relevant jobseeker for a price.

In order to extract jobseekers that fit the requisites for a job listing, the relevance module 107 can utilize jobseeker qualifications and preferences, as well as job listing requisites and/or recruiter data. In one embodiment, the relevance module 107 can be configured to retrieve qualifications and preference data from the jobseeker profiles database 114. Preference data in the jobseeker profile can be either implicit or explicit. In another embodiment, the relevance module 107 can be configured to obtain a cookie or other stored information in the computing device 102. In yet another embodiment, the relevance module 107 can be configured to query any other data repository that stores data associated with jobseeker preference. Once the data related to jobseeker preferences is collected, the collected data can be stored in association to the jobseeker. In one embodiment, jobseeker preferences can be stored in a jobseeker's profile in the jobseeker profile's database 116. In another embodiment, jobseekers preferences can be stored in a jobseeker computing device 102. For example, the jobseeker's preferences can be stored in the form of one or more cookies.

In a further embodiment, in order to obtain job listings that fit the qualifications of a jobseeker, the relevance module 107 can retrieve data associated with job listings stored in the job listings database 114.

Once, the qualifications of a jobseeker and the requisites of a job listing are matched, the best matches (performed using known methods of matching) can be provided to the recruiter as a list of recommended jobseekers. The recruiter can then select to request a verification of jobseeker data of one or more of the recommended jobseekers.

In one embodiment, an accounting module 112 can be included as part of the computer infrastructure operated by the listing service provider 120. The accounting module can be configured to communicate with a recruiter profiles database 118 to store and retrieve recruiter's profiles data, payment history, billing, etc.

In one embodiment, the accounting module 112 can provide a multi-tiered pricing for verification of jobseeker data. In one example, the accounting module 112 can be configured to charge the recruiter a base price if the recruiter requests a general verification of prior employment, a higher price for also receiving endorsements by endorsers, and a premium price for in addition to the previous verification services, the recruiter can also verify contact information of the jobseeker and endorsers.

In another example, the accounting module 112 can be configured to charge the recruiter a discount package price for verifying jobseeker data of a predetermined number of jobseekers. For instance, the recruiter may be charged fifteen dollars for verifying information of ten jobseekers, and twenty five dollars for verifying information of ten of twenty jobseekers.

While various databases have described in FIGS. 1A and 1B, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
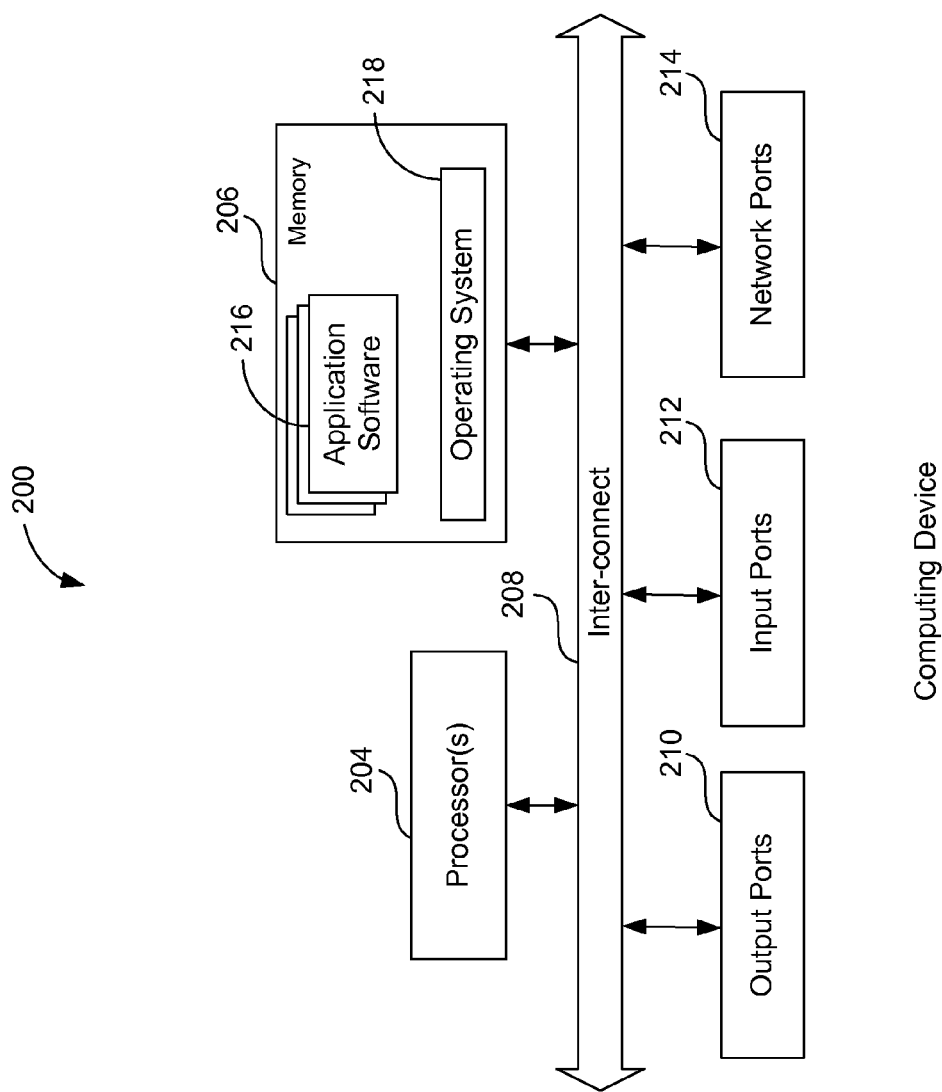
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, receive and transmit digital signals, as required by the jobseeker computing device 102. In another example, the computing device 200 can be utilized to process calculations, execute instructions, receive and transmit digital signals, receive and transmit search queries, job listings, and hypertext, as required by the relevance module 107, the search engine 108, the user interface module 110, the verification module 111, the accounting module 112, and the scoring module 113.

The computing device 200 can be any general or special purpose computer now known or to become known capable of performing the steps and/or performing the functions described herein, either in software, hardware, firmware, or a combination thereof.

The computing device 200 includes an interconnect 208 (e.g., bus and system core logic), which interconnects microprocessor(s) 204 and memory 206. The interconnect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output ports 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The interconnect 208 can also include a network connection 214.

The memory 206 may include ROM (Read Only Memory), and volatile RAM (Random Access Memory) and non-volatile memory, such as a hard drive, flash memory, etc. Volatile RAM is typically implemented as dynamic RAM (DRAM), which requires continuous power in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

Figure 3:
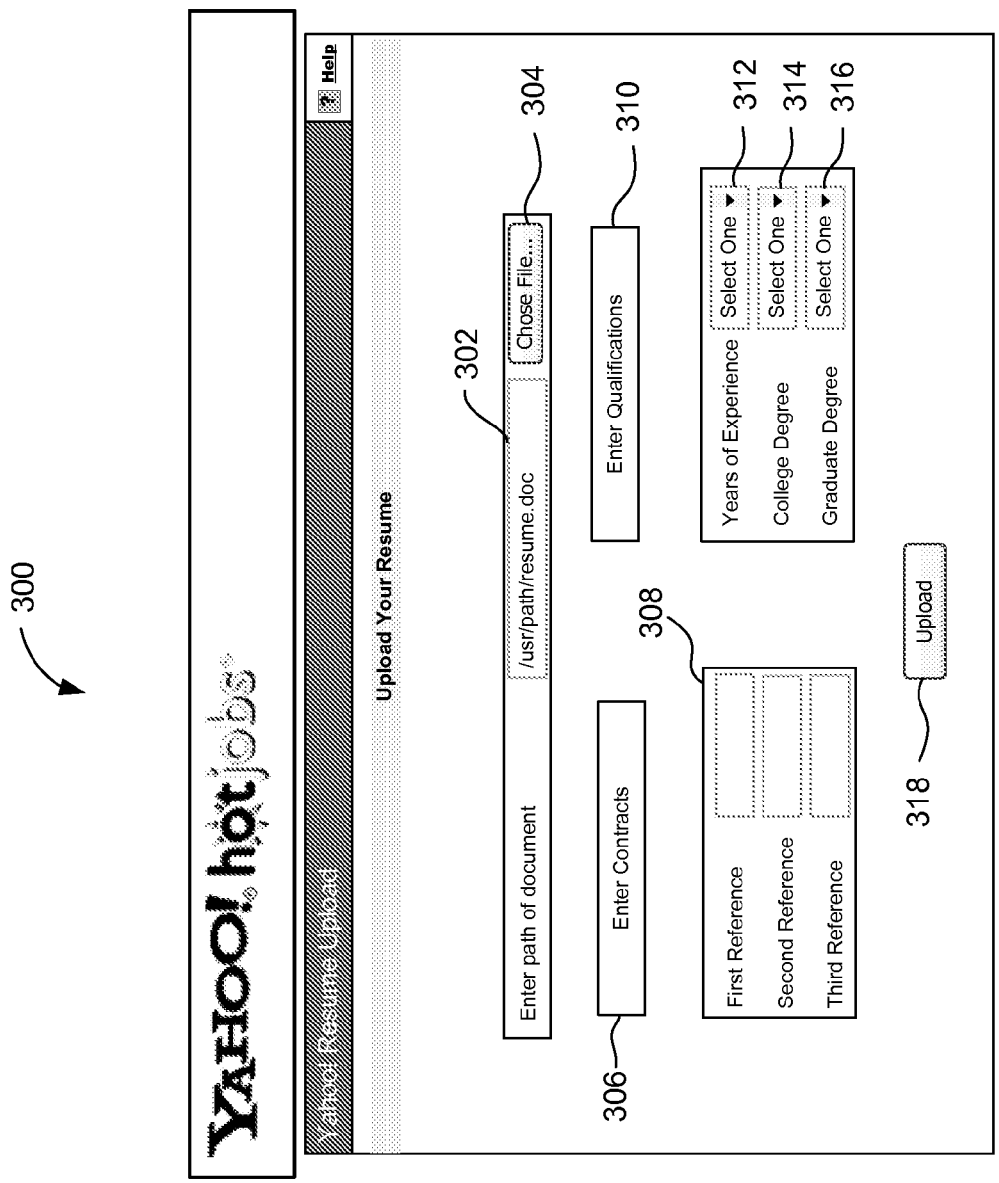
FIG. 3 depicts an exemplary user interface for uploading a resume according to one embodiment.

FIG. 3 depicts an exemplary user interface for uploading a resume according to one embodiment. A jobseeker can upload his or her resume through a website of the job listing service provider 120. A jobseeker can enter the file path of the location of a digital document that corresponds to the jobseeker's resume in a text field 302. In one example, the jobseeker can choose the file path by selecting a button 304 to browse the contents of one or more data storage devices associated with the jobseeker computing device 102.

Once the file path of the resume is entered by the jobseeker, the jobseeker can explicitly indicate jobseeker's references or contacts. For example, the jobseeker can enter a first contact, a second contact, or a third contact in the using one or more text fields 308. Thus, contacts or references explicitly provided by jobseekers can then be obtained from the fields entered by the jobseeker. These contacts or references can be used by the verification module 111 in order to check references and in general data of the jobseeker.

In another example, the jobseeker can explicitly enter qualifications or previous job functions. For example, the jobseeker can enter the years of experience of the jobseeker in a drop down box 312. In another example, the jobseeker can enter the bachelor's degree received by the jobseeker in a drop down box 314. In another example, the jobseeker can enter the graduate degree received by the jobseeker in a drop down box 316.

Upon receiving a command to upload the resume, and the entered job functions and qualifications, the search engine 108 can be configured to parse the text in the resume. The text in the resume can further be utilized by the search engine 108 and the search engine 108 in order to establish implicit job functions and qualifications of the jobseeker. As such, the search engine 108 can identify words or areas of experiences based on the submitted resume of the jobseeker. Therefore, specific skills, industries, locations, prior employers, education, etc., can be identified in relation to a jobseeker. For example, the search engine 108 can be configured to recognize text that corresponds to a geographical location such as cities and states that are included in the resume. Then, based on the frequency of appearance in the resume, geographical locations can be implicitly included in the jobseeker's profile as being geographical areas where the jobseeker has previously worked.

As mentioned before, the verification module can request endorsement of one or more pieces of data corresponding to a jobseeker from one or more endorsement modules. Therefore, the verification module 111 can for example request endorsement of the previous location of employment of the jobseeker and verify the validity of the geographical areas derived from the resume.

In addition other user interfaces can also be provided to the jobseeker such that the jobseeker can enter explicit job functions, experience, references and/or qualifications later utilized to further refine a job search submitted by a jobseeker.

Figure 4:
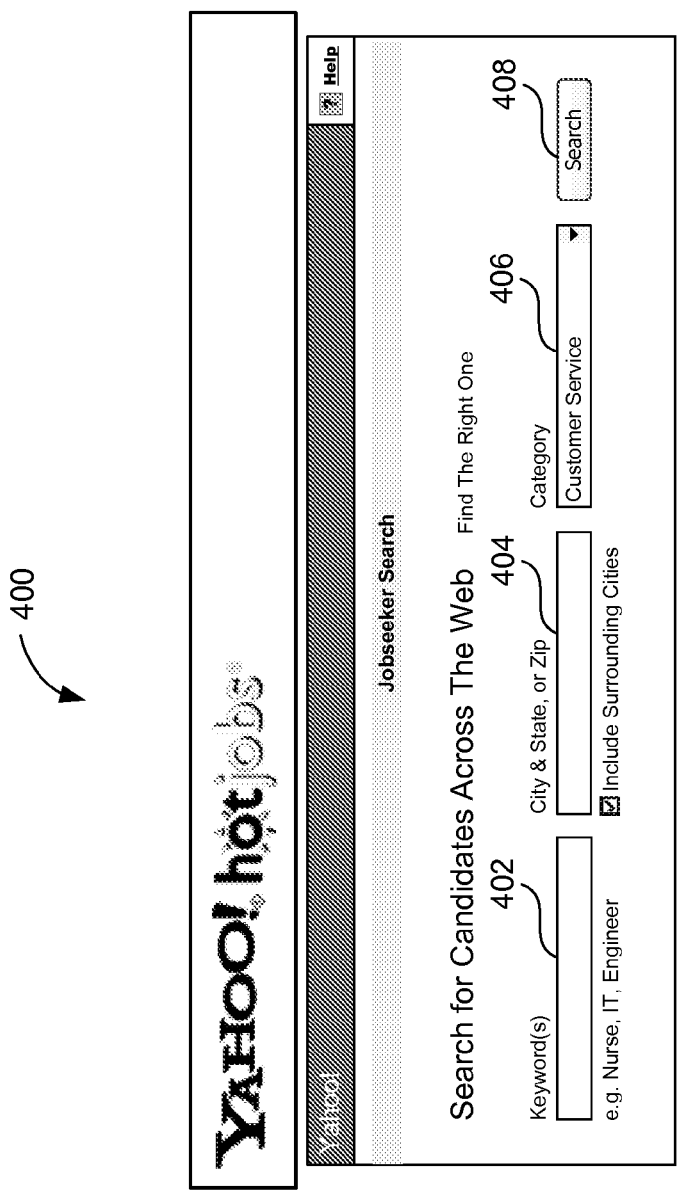
FIG. 4 depicts an exemplary user interface for permitting a recruiter to enter and submit a search for jobseekers according to one embodiment.

FIG. 4 depicts an exemplary user interface for permitting a recruiter to enter and submit a search for jobseekers according to one embodiment. User interface 400 can be utilized by a recruiter to search for jobseekers, and request jobseeker data verification. User interface 400 includes text fields 402 and 404 that a recruiter can utilize to enter searching criteria. For example, in text field 402 a recruiter can enter keywords that can be utilized to locate jobseekers that have profile metadata associated with such keywords. In addition, the recruiter can also enter city, state or zip code as well as selecting whether surrounding cities can be included at text field 404.

Furthermore, user interface 400 can also include a drop down menu 406 that would permit a recruiter to enter a category of the jobseeker. The category of the jobseeker can be categories in which the jobseeker has indicated to possess skills, expertise, certification, etc. Examples of categories can include customer service, technology, legal, entertainment, sales, etc. In addition, a search button 408 can be also provided in order to execute a search.

As previously discussed, the search engine 108 can utilize searched words entered by the recruiter to retrieve jobseekers from the jobseekers profiles database 116. Thus, keywords entered into text field 402, as well as the location entered in 404, and job industries or categories located in 406, can be utilized as part of the search of the jobseekers profile database 116. If for example the recruiter enters the keywords "software" and "engineer" in text field 402, the job listings provided would include any job listing that has as part of the title or metadata associated with the job listing the words engineer and software.

Figure 5:
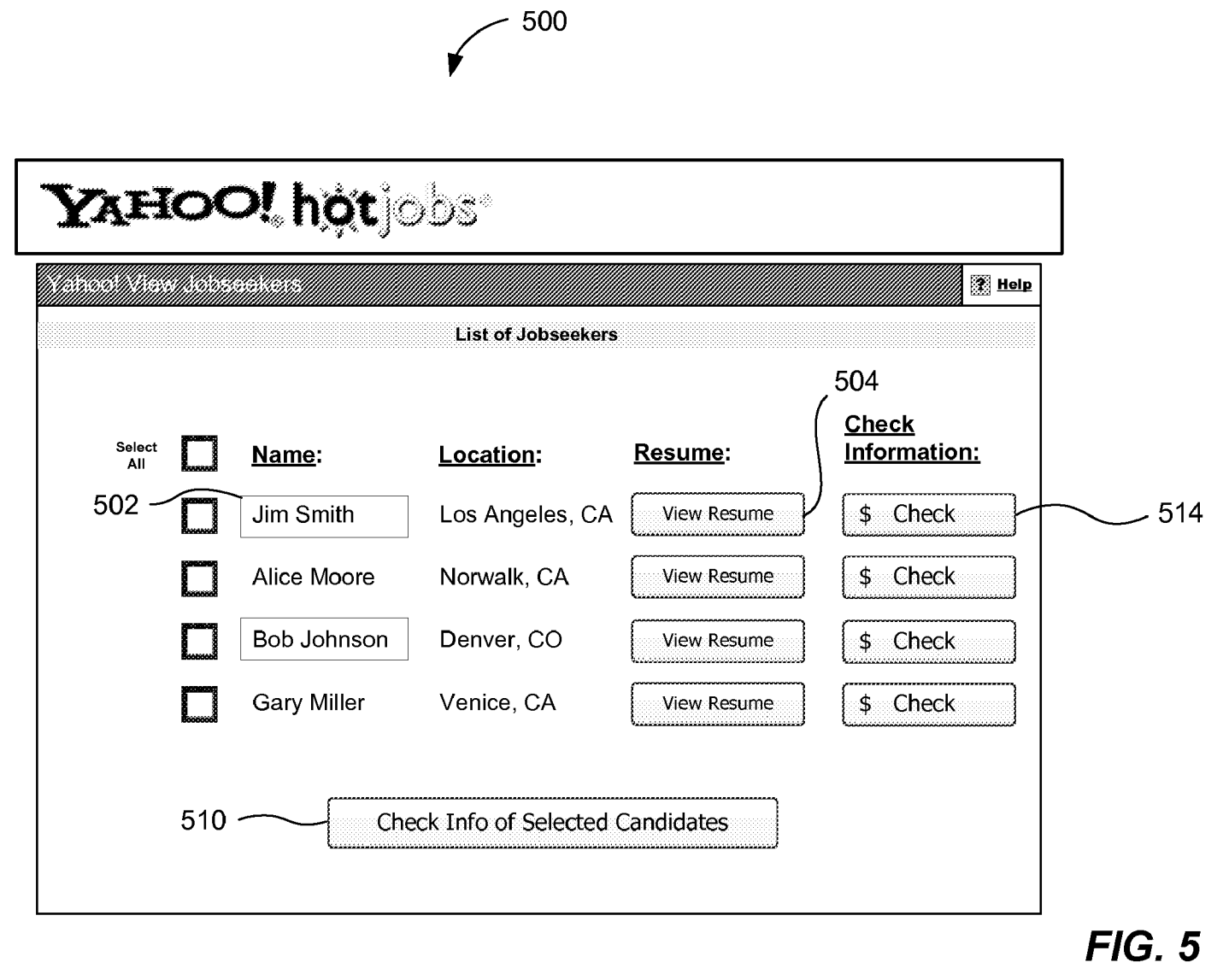

FIG. 5 depicts an exemplary user interface for listing jobseekers according to one embodiment. The listing of jobseeker presented to the recruiter can be derived from a search received from the recruiter. In one example, the search engine 108 determines that metadata associated with the jobseeker profile and qualifications and/or preferences of the jobseeker matched the search criteria entered by the recruiter. For instance, the jobseeker corresponding to listing 502 is displayed in the list of jobseekers because one or more qualifications of the jobseeker match the search criteria.

In another embodiment, the listing of jobseekers presented to the recruiter can be a list of jobseekers who have applied for a job listing listed by the recruiter. Thus, once the jobseeker or multiple jobseekers apply for a job listing, the recruiter can be provided with a list of jobseekers who have applied for the job listing of the recruiter. In one embodiment, the recruiter can receive an email alerting the recruiter that a jobseeker has applied for the job associated with a job posting of the recruiter. In another embodiment, the job listing service provider 120 permits the recruiter to visit a web page that lists all the job postings of the recruiter as well as associated listings of applicants for each job posting.

In another embodiment, the listing of jobseekers presented to the recruiter can be a list of jobseekers that are recommended to the jobseeker. In another embodiment, the recruiter can be presented with a list of recommended jobseekers for multiple jobs posted by the recruiter. As previously mentioned the relevance module 107 can determine whether metadata associated with the jobseeker profile (e.g., qualifications and/or preferences of the jobseeker) match requisites of one or more jobs posted by the recruiter. Matching jobseekers can be presented to the recruiter and listed with access to check references and jobseeker data. As such, the recruiter is presented with the option of checking jobseeker data of one or more recommended jobseekers.

User interface 500 includes a listing 502 that corresponds to a jobseeker. As such, the recruiter is presented with the option of checking the jobseeker data provided by the recruiter. Thus, the recruiter can view the resume of the jobseeker corresponding to the listing 502 by selecting button 504. Once the recruiter determines that the recruiter is interested in the jobseeker, the recruiter can select button 514 in order to verify the jobseeker information corresponding to the jobseeker of listing 502. The recruiter can select to check the jobseeker information by pressing or clicking on the button 512. The accounting module 112 can then calculate the amount to be charged to the recruiter for checking the jobseeker information of the jobseeker corresponding to listing 502.

In another embodiment, a button 510 can be provided to select multiple jobseekers and verify the associated jobseeker information. For example, the recruiter can check the one or more checkboxes associated with jobseekers and list of jobseekers and select to verify the jobseeker information of the selected jobseekers in bulk. This option would allow a recruiter to verify jobseeker information for multiple jobseekers at a discounted price. In one example, the job listing service provider 120 can provide a price structure that a recruiter can select. For example, a recruiter can select to verify jobseeker information of ten jobseekers at the price of one dollar per check. In another example, the recruiter can select to verify jobseeker information of twenty jobseekers at the price of eighty cents of a dollar per unit.

Figure 6:
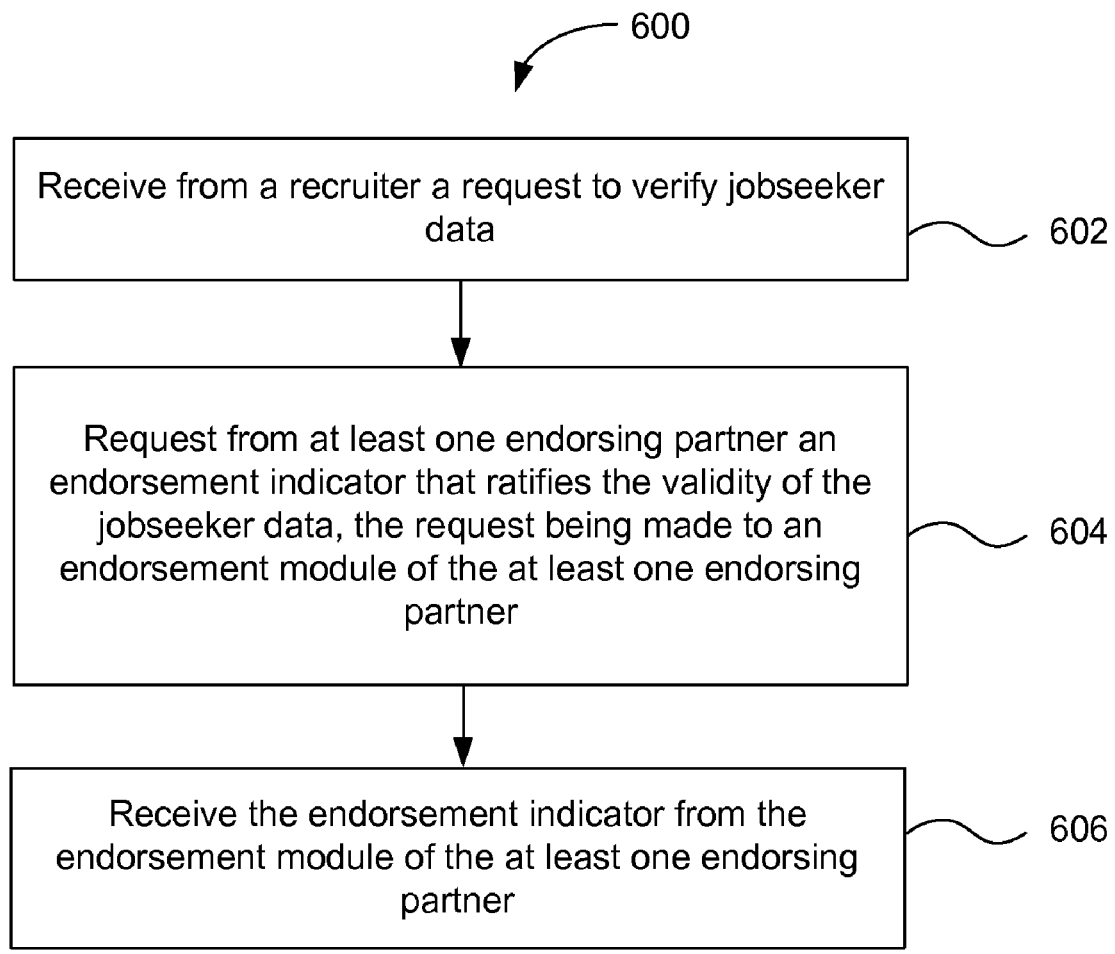
FIG. 6 depicts a flow diagram of a process for verifying jobseeker information according to one embodiment.

FIG. 6 depicts a flow diagram of a process for verifying jobseeker information according to one embodiment. At process block 602 a request to verify jobseeker data can be received from a recruiter. As previously mentioned, the recruiter can enter such request by selecting a button or any other user interface provided on the web page of the job listing service provider 120. Process 600 continues at process block 604.

At process block 604, an endorsement indicator is requested from at least one endorsing partner. The endorsement indicator can ratify the validity of a jobseeker data. A request for the endorsement indicator can be made to an endorsement module of the at least one endorsing partner. Process 600 continues at process block 606. At process block 606, the endorsement indicator can be received from the endorsement module of the at least one endorsing partner. As previously mentioned, the endorsement indicator can be provided in one or more different ways. For example, the endorsement indicator can be the profile of the jobseeker. In another example, the endorsement indicator can be the profile of a reference of the jobseeker. In yet another example, the endorsement indicator can be the number of endorsements from contacts of the jobseeker within a social network.

Figure 7:
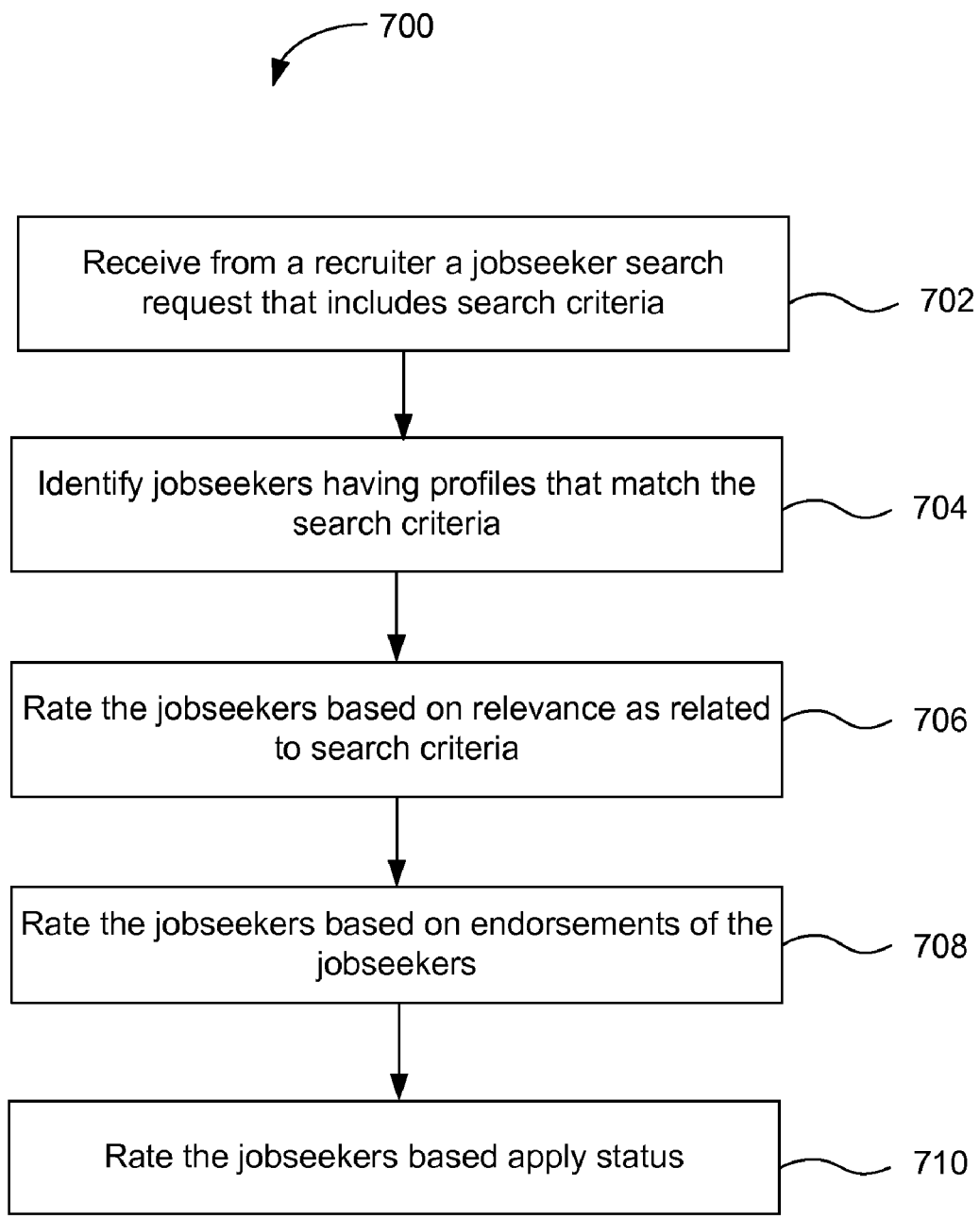
FIG. 7 depicts a flow diagram of a process for rating information of searched jobseekers according to one embodiment.

FIG. 7 depicts a flow diagram of a process for rating information of searched jobseekers according to one embodiment. At process block 702 a jobseeker search request is received from a recruiter. The jobseeker search request can include search criteria entered by the recruiter in order to list jobseekers that meet the criteria for which the recruiter is searching. Process 700 continues at process block 704.

At process block 704, jobseekers having profiles that match the search criteria entered by the recruiter are identified. In one example, a listing of the jobseekers can be provided to the recruiter for viewing and to select jobseekers that the recruiter likes. Process 700 continues at process block 706.

At process block 706, a relevance rating can be calculated for the jobseekers that are listed as part of the results from the search. The relevance rating can be calculated based on the relevance to keywords in the search criteria. For instance, some jobseekers' profiles might have more matching terms to keywords in the search criteria than jobseeker profiles. As such, the jobseekers can be rated based on the relevance to the search criteria. Process block 700 continues at process block 708.

At process block 708, an endorsement rating can be calculated based on the endorsements received from various endorsement modules. For instance, if the endorsements for a first jobseeker are positive endorsements that are higher in number than the positive endorsements for a second jobseeker, the first jobseeker will be rated higher than the second jobseeker. Process 700 continues at process block 710.

At process block 710, an apply rating can be calculated the jobseekers based on whether the jobseekers have applied to jobs listed by the recruiter. As such, recruiters can view jobseekers that have higher ratings not only because the jobseekers are more relevant to the search criteria entered by their recruiter as well as having better endorsements, but also because the jobseekers have expressed an interest in the job listings provided by the recruiter. Therefore, jobseekers who have applied for job listings of the recruiter may be rated higher than jobseekers who have not applied for listings of the recruiter. In addition, jobseekers who have indirectly applied for a job listing of a recruiter can have a higher rating as well. For example, if a jobseeker has not directly applied for a job listing of the recruiter but has applied to a similar job or a job that has been applied for by another jobseeker as well as the job listing of the recruiter, the jobseeker can be provided with a higher rating based on an indirect apply.

In one embodiment, the relevance rating, the endorsement rating, and the apply rating can be combined into a total rating. The total rating can be an average of the relevance rating, the endorsement rating, and the apply rating. In another example, the total rating can be a raw sum of the relevance rating, the endorsement rating, and the apply rating. In yet another example, the total rating can be a weighted sum of the relevance rating, the endorsement rating, and the apply rating. The weighted sum can be calculated based on the following formula Total rating=w1*r1+w2*r2+wn*rn, where r1 can be the relevance rating, r2 can be the endorsement rating, and r3 can be the apply rating.

Figure 8:
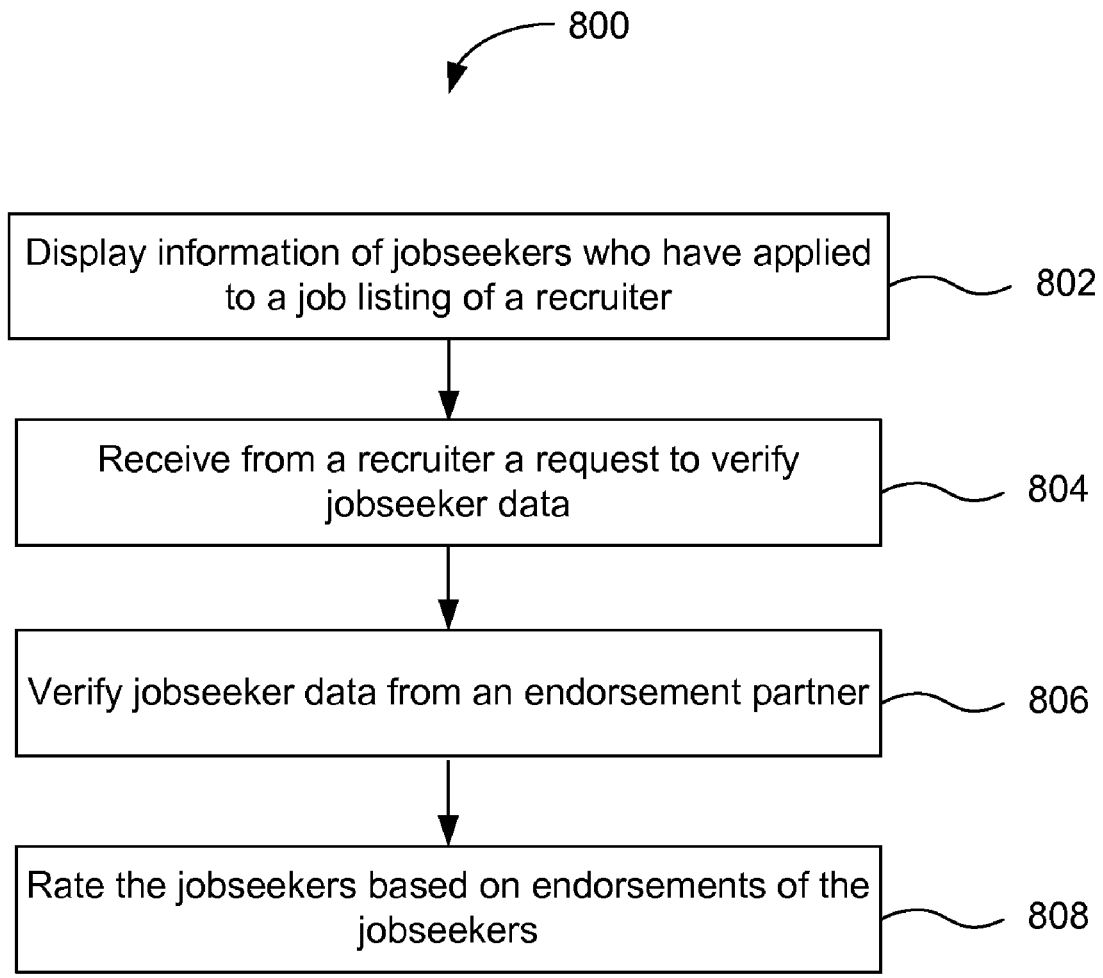
FIG. 8 depicts a flow diagram of a process for rating information of applying jobseekers according to one embodiment.

FIG. 8 depicts a flow diagram of a process for rating information of applying jobseekers according to one embodiment. At process block 802, a list of jobseekers and associated information of jobseekers who have applied to a job listing of a recruiter is displayed. The list of jobseekers can be displayed to the recruiter such that the recruiter can select to check information or jobseeker data. Process 800 continues at process block 804.

At process block 804, a request to verify jobseeker data is received from a recruiter. Process 800 continues at process block 806. At process block 806, jobseeker data is verified by an endorsing partner. As previously discussed, jobseeker data can be verified by requesting the endorsing partner for one or more endorsement indicators and receiving the endorsement indicators from the endorsing partner. The endorsement indicators can be, for example, received from endorsement modules hosted by the endorsing partner. Process 800 continues at process block 808.

At process block 808, the jobseekers can be rated based on endorsements received from one or more endorsement modules. As previously mentioned, endorsing partners can be social networks or any other third party entities that can provide data or access to verification data via data network 104. If the jobseeker data validity is verified by one or more endorsement modules, and multiple endorsement indicators are received for a jobseeker, the jobseeker can be rated highly. If, for example, no endorsements are received for a jobseeker, the jobseeker can be rated low.

Figure 9:
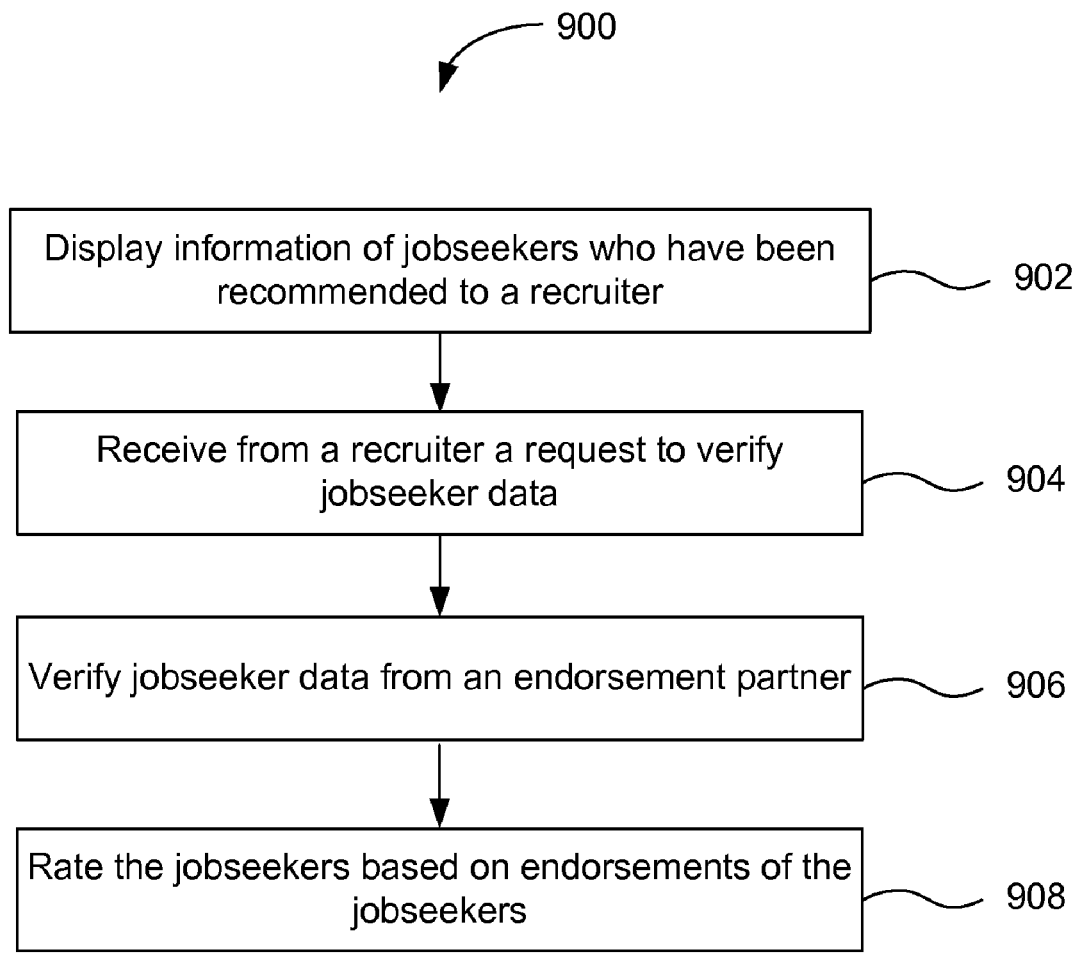
FIG. 9 depicts a flow diagram of a process for rating information of recommended jobseekers according to one embodiment.

FIG. 9 depicts a flow diagram of a process for rating information of recommended jobseekers according to one embodiment. At process block 902, a list of jobseekers and associated information of jobseekers that have been recommended to a recruiter is displayed. The list of jobseekers can be displayed to the recruiter such that the recruiter can select to check information or jobseeker data. Process 900 continues at process block 904.

At process block 904, a request to verify jobseeker data is received from a recruiter. Process 900 continues at process block 906. At process block 906, jobseeker data is verified by an endorsing partner. Again, jobseeker data can be verified by requesting the endorsing partner for one or more endorsement indicators and receiving the endorsement indicators from the endorsing partner. Process 900 continues at process block 908.

At process block 908, the jobseekers can be rated based on endorsements received from one or more endorsement modules. If the jobseeker data validity is verified by multiple endorsement modules, and positive endorsement indicators are received by the verification module, the jobseeker can be rated highly.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising:
receiving, by a computing device and from a recruiter computing device, a request to verify jobseeker data associated with a jobseeker;

requesting, by the computing device and from an endorsement module of at least one endorsing partner capable of verifying jobseeker data, an endorsement indicator that ratifies the validity of the jobseeker data;

receiving, by the computing device, the endorsement indicator from the endorsement module of the at least one endorsing partner;

calculating, by the computing device, a relevance rating, an endorsement rating, and an apply rating for the jobseeker; and calculating, by the computing device, a total rating for the jobseeker based on the relevance rating, the endorsement rating, and the apply rating.

2. The method of claim 1, wherein the jobseeker data is stored in a jobseeker profile.

3. The method of claim 1, wherein the endorsement indicator is a number of endorsers for the jobseeker.

4. The method of claim 1, wherein the endorsement indicator is a profile of the jobseeker that can be used to confirm jobseeker data.

5. The method of claim 1, wherein the endorsement indicator is a reference profile corresponding to an endorser of the jobseeker.

6. The method of claim 5, further comprising requesting from the at least one endorsement module a secondary endorsement indicator that verifies data in the reference profile.

7. The method of claim 1, wherein the at least one endorsing partner is an Internet social network company, a university, a company, or a previous employer of the jobseeker.

8. The method of claim 1, further comprising presenting the endorsement indicator to the recruiter computing device.

9. The method of claim 1, further comprising calculating a rating for the jobseeker based on the endorsement indicator received for the jobseeker.

10. A system comprising:
a user interface module executing on a computing device that receives from a recruiter computing device a request to verify jobseeker data;

a verification module executing on the computing device that requests, from an endorsement module of at least one endorsing partner capable of verifying jobseeker data, an endorsement indicator that ratifies the validity of the jobseeker data, the verification module further configured to receive the endorsement indicator from the endorsement module of the at least one endorsing partner; and a rating module executing on the computing device that calculates a relevance rating, an endorsement rating, and an apply rating for the jobseeker, the rating module further calculates a total rating for the jobseeker based on the relevance rating, the endorsement rating, and the apply rating.

11. The system of claim 10, wherein the jobseeker data is stored in a jobseeker profile.

12. The system of claim 10, wherein the endorsement indicator is a number of endorsers for the jobseeker.

13. The system of claim 10, wherein the endorsement indicator is a profile of the jobseeker that can be used to confirm jobseeker data.

14. The system of claim 10, wherein the endorsement indicator is a reference profile corresponding to an endorser of the jobseeker.

15. The system of claim 10, wherein the verification module can request from the at least one endorsing partner a secondary endorsement indicator that verifies data in the reference profile.

16. The system of claim 10, wherein the at least one endorsing partner is an Internet social network company, a university, a company, or a previous employer of the jobseeker.

17. The system of claim 10, wherein the user interface module can be configured to present the endorsement indicator to the recruiter computing device.

18. The system of claim 10, further comprising a rating module that calculates a rating for the jobseeker based on the endorsement indicator received the jobseeker.

19. A method comprising:
receiving, by a computing device and from a recruiter computing device, a request to verify jobseeker data associated with a jobseeker;

requesting, by the computing device and from an endorsement module of at least one endorsing partner capable of verifying jobseeker data, an endorsement indicator that ratifies the validity of the jobseeker data;

receiving, by the computing device, the endorsement indicator from the endorsement module of the at least one endorsing partner;

calculating, by the computing device, a relevance rating, an endorsement rating, and an apply rating for the jobseeker; and calculating, by the computing device, a total rating for the jobseeker based on the relevance rating, the endorsement rating, and the apply rating.

20. A system comprising:
a user interface module executing on a computing device that receives from a recruiter computing device a request to verify jobseeker data;

a verification module executing on the computing device that requests, from an endorsement module of at least one endorsing partner capable of verifying jobseeker data, an endorsement indicator that ratifies the validity of the jobseeker data, the verification module further configured to receive the endorsement indicator from the endorsement module of the at least one endorsing partner;

a rating module executing on the computing device that calculates a relevance rating, an endorsement rating, and an apply rating for the jobseeker, the rating module further calculates a total rating for the jobseeker based on the relevance rating, the endorsement rating, and the apply rating.

21. The method of claim 19, wherein the at least one endorsing partner is an Internet social network company, a university, a company, or a previous employer of the jobseeker.

22. The system of claim 20 wherein the at least one endorsing partner is an Internet social network company, a university, a company, or a previous employer of the jobseeker.

* * * * *